United States Patent Office 3,224,188
Patented Dec. 21, 1965

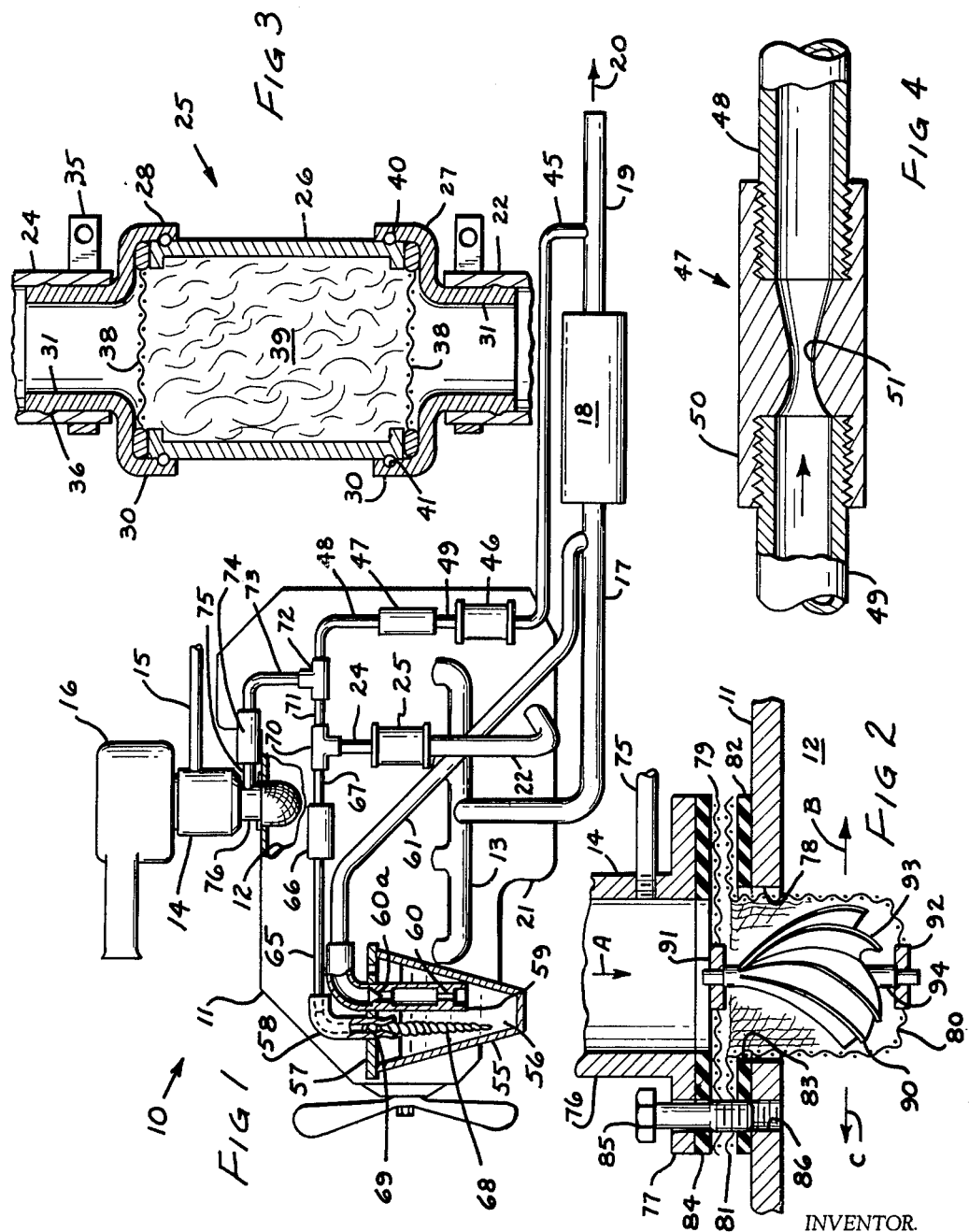

1

3,224,188
COMBUSTION CONTROL
Joseph S. Barlow, 1957 Maiden Lane, Altadena, Calif.
Filed Apr. 10, 1964, Ser. No. 358,787
4 Claims. (Cl. 60—30)

This invention relates to combustion control devices, and more particularly to devices for improving the combustion in internal combustion engines and removing toxic products of combustion associated therewith.

A primary object of this invention is to provide a means operable to transform the toxic exhaust products, normally associated with internal combustion engines, into non-toxic products.

A related object of this invention is to provide a means for reducing combustion temperature in the engine and thereby decrease the production of toxic fumes without creating harmful deposits in the engine.

A preferred but optional feature of this invention provides a means for mixing and turbulizing the fuel and gases entering the intake manifold from the carburetor in order to provide more uniform and complete combustion in all of the combustion chambers in the engine. The term "turbulizing" as used herein means rendering a fluid flow turbulent in nature instead of laminar.

The control of emissions from combustion engines requires control of both crankcase and exhaust pipe emissions, each of which has its own special problems. For example, many crankcase control devices presently in use feed back the fumes from the crankcase breather pipe to the intake manifold and thereby cause serious depositing of sludge on the working parts of the engine, particularly on the intake valves, and upset carburetion. This is one class of problem wherein fumes that are heavily contaminated with solid and condensible materials must be handled.

Another class of problems relates to the situation wherein toxic exhaust products such as nitrous oxide are produced at temperatures normally encountered during combustion in gasoline engines. As the combustion temperature is lowered, the production of these toxic products diminishes, and therefore such a reduction is potentially useful. Feedback of the exhaust fumes for the purpose of lowering the combustion temperatures and thereby decreasing toxic crankcase emissions is presently being attempted. However, in doing this in presently-known ways, harmful sludge deposits may result, causing fouling in the engine so that continuous maintenance is required. While the feedback of these exhaust fumes attempts to reduce the production of the toxic exhaust gases, there is no attempt made to destroy the toxic fumes remaining. As a result considerable quantities of obnoxious fumes are still liberated into the atmosphere, and cause air pollution, and it is an object of this invention to still further reduce their production by utilizing catalytic means.

As to exhaust pipe emissions, it is clearly impossible to bottle them up or to recirculate them for treatment in their entirety. Instead, the control should be exerted at the source, and minimize the formation of the largely gaseous obnoxious products.

Another undesirable feature in many engines is that there is no known adequate means evenly to disperse the fuel mixture to all cylinders from the carburetor. The fuel mixture usually enters at the center of the intake manifold from the carburetor. As a result, those cylinders closest to the point of entrance consume most of the fuel mixture, and consequently the other cylinders are starved. The conventional means to overcome this problem is to provide more carburetors, and supply fewer cylinders with each. Secondly there is an insufficiency or total absence of flame arrestors rendering the engine extremely dangerous because of the possibility of flameouts caused by preignition while the intake valve is still open.

This invention provides a means for injecting a catalyst, and exhaust and crankcase gases, at a predetermined rate, between the carburetor and the intake valves. The purpose of the catalyst is to promote the conversion, in conditions of cool temperatures, the toxic products of combustion to non-toxic substances such as carbon dioxide and nitrogen. A purpose of the introduction of exhaust gases into the manifold is to control combustion products by lowering the detonation temperature to a point where relatively little nitrous oxide is formed. The exhaust gases are supplied from the crankcase breather pipe and by a feedback of some of the effluent from the tail pipe. The sludge and other harmful solid particles are filtered out before they enter the system.

This invention provides a means operable to add a catalytic substance into the system to alter the remaining toxic products of combustion to a non-toxic state. The catalyst may be added before combustion in the throat of the carburetor, or after combustion in the exhaust manifold. It is preferred however, that the catalyst be added both before and after combustion.

An optional feature of this invention resides in a turbine member or turbulizer, disposed between the carburetor and the intake valves, preferably in the entry port of the intake manifold in order to mix the fuel-air mixture with the catalyst and exhaust fumes before the mixture enters the intake manifold, and thereby to provide even distribution of the mixture to all cylinders.

The above and other features of this invention will be more fully understood from the following detailed description and the accompanying drawings in which:

FIG. 1 is a side view, partly in cross section, of a combustion control system according to this invention, installed on an internal combustion engine;

FIG. 2 is a cross section view of a turbulizer attached beneath the carburetor of the engine;

FIG. 3 is a cross section view of a filter useful in this invention; and

FIG. 4 is a cross section view of an orifice which may be used to meter the flow of catalyst and exhaust gases herein.

The drawings show a combustion control system 10 in accordance with this invention attached to an internal combustion engine 11. Engine 11 has an intake manifold 12 and an exhaust manifold 13, each in fluid communication with combustion chambers (not shown) in the engine. A carburetor 14 is mounted on engine 11, which is operable to meter fuel entering the carburetor from a fuel line 15 into air entering the carburetor from an air filter 16. An exhaust pipe 17 carries exhaust gas from exhaust manifold 13 to a muffler 18. The exhaust gas passes through muffler 18 to a tail pipe 19 and out to the atmosphere as indicated by arrow 20.

A crankcase section 21 of engine 11 has a breather pipe 22 to relieve fumes from the crankcase. Normally the breather pipe allows the gases to escape into the atmosphere, but recently devised smog control devices return them, instead, to the intake manifold, or to the carburetor.

Combustion control 10 comprises a breather pipe extension tube 24 and a crankcase emission filter 25 connected between crankcase breather pipe 22 and intake manifold 12. Tube 24 provides a continuation of the breather pipe as a passage for the crankcase fumes into the intake manifold. Filter 25 removes any solid or readily condensible particles which may be deleterious to engine operation.

FIG. 3 shows a construction for filter 25 which may be attached between crankcase breather pipe 22 and intake manifold 12 to remove solid particles. Filter 25 comprises a central tubular cartridge 26 attached at its ends to an inlet member 27 and an outlet member 28. Members 27 and 28 are constructed substantially alike and each has an outer circular flange 30 extending around its periphery adapted to extend around the outer periphery of cartridge 26. Members 27 and 28 both have a centrally located circular neck 31 of smaller diameter than flange 30 adapted to facilitate the clamping of tubes 22 and 24 respectively.

A suitable clamp for fastening tubes 22 and 24 to members 27 and 28 is a U shaped clamp 35, shown inserted around the overlap of member 28 and tube 24. Holes are provided in the extremities of U member 35 to insert a screw which may be used to tighten the clamp. A protrusion 36 is disposed around the outer periphery of neck 31 of members 27 and 28 to provide adequate clamping of tubes 22 and 24.

Two circular support screens 38 are supported between filter 25 at opposite ends of cartridge 26 and each of members 27 and 28. Screens 38 are disposed in a plane substantially perpendicular to the direction of fluid flow between inlet 27 and outlet 28. Screens 38 serve to support a filter element 39 in the region within cartridge 26. A suitable filter element, such as lamb's wool, provides means to remove solid or readily condensible material as the fumes pass through the filter from inlet 27 to outlet 28.

An O-ring 40 is inserted into a groove 41 around the inner periphery of flange 30 of members 27 and 28. Rings 40 are adapted to snap into mating grooves in the outer periphery of cartridge 26 adjacent its ends when members 27 and 28 are properly united to cartridge 26. Filter element 39 and screens 38 are easily accessible for replacement by unsnapping cartridge 26 from members 27 and 28.

An exhaust tube 45 extends from tail pipe 19 to an exhaust filter 46, similar to filter 25, and thence to a metering orifice 47. An exhaust tube extension 48 is attached to orifice 47 to allow passage of exhaust fumes into intake manifold 12. A suitable embodiment of orifice 47 is shown in FIG. 4. An inlet tube 49 and tube extension 48 are each connected to opposite ends of a cylindrical orifice member 50 to allow fluid to pass from inlet 49 to the tube extension 48 at the outlet. Orifice member 50 has a throat 51 of a reduced cross-section, compared to the inner cross-sections of tubes 48 and 49. The reduced size of throat 51 of orifice 47 restricts the flow of fluids therethrough, so that a desired rate of flow may be obtained by proper selection of throat cross-section.

A reservoir in the form of an open-mouthed vessel 55 adapted to hold a liquid catalyst 56 is mounted in a convenient location above the horizontal level of exhaust pipe 17, within the engine compartment of the vehicle. Vessel 55 has a lid 57 with a vent therethrough to atmosphere. The lid is adapted to pass two tubes 58 and 59 from outside the vessel to the region inside the vessel. Tube 59 includes a metering orifice 60, similar to orifice 47, and terminates in the lower regions of vessel 55 under the surface of a liquid catalyst 56. Tube 59 serves as an inlet tube to orifice 60. Tube 59 also includes a uni-directional check valve 60a which connects orifice 60 to tube 61. Tube 61 connects valve 60a to exhaust pipe 17. The pulsating pressures in exahust pipe 17 exert a gentle pumping action by virtue of orifice 60 and check valve 60a, so that a metered flow of catalyst is injected into the exhaust gases in pipe 17, there to catalyze a chemical reaction which renders the noxious components of the exhaust steam benign.

Tube 58 is shown to extend from within vessel 55 to a location outside the vessel where it is joined to an end of a tube 65. Tube 65 serves as an inlet tube to a metering orifice 66, similar to orifice 47, which in turn discharges fluid into an outlet tube 67. As with tubes 24 and 48, tube 67 conducts fluid flowing through the orifice to intake manifold 12. A wick 68 is stuffed into tube 58 and extends downward into the deeper regions of the catalytic solution in the vessel. The wick is preferably made of a substance such as cotton which will absorb the solution and draw it into the tube by capillary action. Wick 68 is shown with a knot 69 at its upper extremity, and tube 58 is pinched at a point directly beneath knot in order to support the wick within tube 58. Air is drawn past the wick and entrains the solution with it, and carries this metered amount of solution toward the intake manifold, first mixing it with the recirculated exhaust and crankcase gases at T 72.

As previously stated, the purpose of the catalyst solution is to transform the usual toxic products of combustion into a non-toxic state. It has been found that some copper salts, such as $CuSO_4$ or $CuCr_2O_7$, function effectively for this purpose when in an atmosphere of carbon monoxide and nitrous oxide to catalyze reactions which transform them into a harmless state. For example, it has been found that:

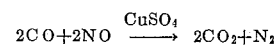

$$2CO + 2NO \xrightarrow{CuSO_4} 2CO_2 + N_2$$

Thus it can be seen that two obnoxious substances often found in engine emissions are transformed, in the presence of copper sulphate and heat of exhaust, into harmless carbon dioxide and nitrogen gas.

FIG. 1 shows tubes 24 and 67 joining at a T 70 and passing out through an outlet tube 71, which in turn joins tube 48 at T 72, the combined contents being conducted by tube 73 to the exhaust manifold. A turbulizer 74, similar to a turbulizer 90 yet to be described, is attached to the end of tube 73 to thoroughly mix the combined exhaust gas, crankcase gas, and catalyst solution. An outlet tube 75 is attached between turbulizer 74 and the throat 76 of the carburetor 14 and serves to discharge the fluids passing through the orifice into the fuel-air mixture below the carburetor.

FIG. 2 shows, in greater detail than FIG. 1, the mechanical assembly of the combustion control and turbulizer where they are connected below the carburetor 14. Throat 76 of carburetor 14 has a circular flange 77 adapted to mount onto the engine in alignment with an opening 78 in engine 11 to provide access to the intake manifold 12. A circular wire mesh screen 79 having an outer periphery substantially the same as flange 77 is disposed between throat 76 and engine 11. A wire mesh screen cup 80 having a flange 81 of the same size as screen 79 has a cup diameter adapted to fit snugly into opening 78. Screen cup 80 is aligned with flange 81 and disposed adjacent to screen 79 with cup 80 projecting through opening 78. A circular sealing gasket ring 82 with a centrally located opening 83 aligned over opening 78 is disposed between flange 81 and engine 11. A similar gasket ring 84 is disposed between screen 79 and flange 77. Bolts, such as bolt 85, are passed through flange 77 and screwed into a threaded hole 86 in engine 11 to attach the carburetor to the engine and allow the mixture of exhaust gas and catalyst and fuel-air mixture to enter into the intake manifold. When bolts 85 are tightened down, gaskets 82 and 84 compress through the mesh of screens 79 and 81 and create an air tight seal between the engine and carburetor.

A turbulizer 90 (to which turbulizer 74 is substantially identical) is disposed directly beneath throat 76, and mounted between two bushings 91 and 92 centrally located in screen 79 and the bottom of cup 80 respectively. The turbulizer comprises a plurality of spirally shaped fins, such as fin 93, mounted on a shaft 94 which is attached in the throat between bushings 91 and 92. The turbulizer is disposed at the entry to the intake manifold, and breaks up the swiftly moving center of the gas moving down from the carburetor, and turns it in lateral direction (shown by arrows B and C), through the surrounding screen cup. Turbulizer 90 serves to help vaporize the fuel and provide additional mixing of the fuel-gas mixture.

The operation of the combustion control device will best be understood by viewing FIG. 1, and assuming engine 11 is running in the normal manner. When the engine is running a negative pressure relative to ambient atmospheric pressure is created in the intake manifold. Since the throat of carburetor 14 is in gaseous communication with the intake manifold, there is also a negative pressure there, and fumes from the tail pipe and crankcase are sucked through lines 45 and 22 respectively. The fumes pass through their respective filters, and mix and then enter from tube 75 into throat 76 of carburtor 12.

Likewise, catalyst solution is drawn through wick 68 and discharged into tube 65. The rate of catalyst flow is determined by orifice 66 and the catalyst mixes with the exhaust gases, ultimately to be discharged through tube 75 into throat 76. The wick is merely one example of a metering device. It may readily be eliminated, in which event orifice 66 would limit the flow rate of solution as a function of orifice size and pressure differential between tubes 61 and 67.

Also, catalyst is pumped, by the pulsating pressure in pipe 17, past orifice 60 and check valve 60a, into the tube 61, from which it enters pipe 17, there additionally to catalyze the reactions from noxious to bengin products. The catalyst vessel 55 is disposed in the engine compartment at a position above the horizontal level of exhaust pipe 17.

As the fuel-air mixture and catalyst and exhaust fume mixture unite in the throat of the carburetor they are drawn into the intake manifold by virtue of the differential pressure. The mixture is blended together and atomized by passing through turbulizer 74, and then strikes turbulizer 90. Additional mixing and fuel vaporization results and the direction of flow of the gaseous mixture changes from a purely downward direction in throat 76 to one including turbulent components in lateral directions, and this turbulent mixture then passes into the intake manifold and to the cylinders. Screen cup 80 further atomizes and blends the mixture before it passes on to the engine cylinders. A secondary purpose of screen cup 80 is to serve as a flame arrestor should a pre-ignition occur and the intake valve open. Screen cup 80 will arrest and extinguish any flame back, as will similar structure in turbulizer 74.

The exhaust fumes, as previously stated, will cause combustion temperatures to decrease below a level where nitrous oxide is produced in substantial quantities. The catalyst will serve to convert the remaining toxic products, through a chemical reaction to relatively harmless products of combustion, such as nitrogen and carbon dioxide.

Should some of the toxic products escape both of these means to diminish their production or alter their chemical characteristics, the additional catalyst injected after combustion will act to transform the remaining toxic products to non-toxic products in the muffler and tail pipe.

It will be appreciated from the foregoing that a number of treatment-circuits are formed in this device. Of probably the greatest importance is the combined recirculation of all crankcase fumes, and a substantial proportion of the exhaust pipe fumes. These, with or without the addition of catalyst solution, keep down the detonation temperatures and reduce the initial formation of noxious gases.

Another important circuit is that wherein the catalyst solution is added to the foregoing gas mixture, because then not only is the reaction to bengin products catalyzed, but the temperatures are reduced still more by the introduction of water to the system, which, in expanding to steam, aids in reducing the temperatures.

Still another important circuit is that of introducing catalyst solution ahead of the muffler, because then the further reaction to bengin products is fostered, and in addition, some of the catalyst will be recirculated with the recirculated exhaust gas.

Further, it will be noted that the system includes two flame arrestors, which significantly improve the safety of operation. Each turbulizer is also a flame arrestor.

Thus, the foregoing systems enable a new method of combustion control to be carried out which exerts positive control over crankcase emissions, and a very substantial control over the quantity of noxious products which finally leave the tail pipe.

The term "exhaust manifold" as used herein includes the entire exhaust system downstream from the engine exhaust valves, and the term "intake manifold" includes the entire intake system upstream of the engine intake valves.

This invention is not to be limited to the specific embodiment shown and illustrated herein which is given by way of illustration rather than of limitation; and the invention is not limited except by the scope of the appended claims.

What is claimed is:

1. A combustion control for an internal combustion engine of the class having a combustion chamber fed with a fuel-air mixture and discharging exhaust gas, said engine having an intake manifold to provide an inlet for said fuel-air mixture to enter said engine and an exhaust manifold to provide an outlet for said exhaust gas to leave said engine, said internal combustion engine creating products of combustion in said combustion chamber, a crankcase in said engine and a crankcase breather including a breather pipe extending from said crankcase to relieve gases therein, said control comprising: an exhaust tube in gaseous communication with said exhaust manifold to remove a portion of said exhaust gas discharged from said engine; a conduit connecting the exhaust tube and said breather pipe with said intake manifold, a metering device in said tube allowing a predetermined gaseous flow rate from said exhaust manifold to said conduit; a reservoir adapted to contain a catalyst solution; means conveying said catalyst solution from said reservoir to said conduit; and a metering device in said means to allow a predetermined catalyst flow rate therefrom.

2. A combustion control in accordance with claim 1 wherein a carburetor is attached to said engine, said carburetor having a throat as a continuation of said intake manifold, said fuel-air mixture mixing with said catalyst solution and said exhaust and crankcase gases, a turbulizer disposed downstream from said carburetor throat in said intake manifold, said turbulizer comprising a plurality of spiral shaped fins disposed and aligned to change direction of said fluid striking thereon.

3. A combustion control in accordance with claim in which the exhaust tube and breather pipe each includes a filter for removing solid and readily condensed material from the steam therethrough.

4. A combustion control in accordance with claim 1 in which a tube interconnects the reservoir and the exhaust manifold, one end of said last-named tube being adapted to stand beneath the liquid level in the reservoir, and a metering orifice and a check valve permitting fluid flow solely toward the exhaust manifold for pumping a metered quantity of fluid from the reservoir into the exhaust manifold.

References Cited by the Examiner

UNITED STATES PATENTS

| | | | |
|---|---|---|---|
| 1,323,006 | 11/1919 | Branen | 123—119 |
| 1,345,323 | 6/1920 | Frazer | 23—288.3 |
| 1,847,452 | 3/1932 | Vaughan | 123—119 X |
| 2,096,526 | 10/1937 | Pratt | 123—119 |
| 2,460,700 | 2/1949 | Lyons. | |
| 2,696,202 | 12/1954 | MacDonald | 123—119 |
| 2,932,364 | 4/1960 | Binter. | |
| 2,946,325 | 7/1960 | Gentile. | |
| 3,146,768 | 9/1964 | Osborne | 123—119 |

FOREIGN PATENTS 774,734   9/1934   France.

SAMUEL LEVINE, *Primary Examiner.*

EDGAR W. GEOGHEGAN, *Examiner.*

UNITED STATES PATENT OFFICE
CERTIFICATE OF CORRECTION

Patent No. 3,224,188                                December 21, 1965

Joseph S. Barlow

It is hereby certified that error appears in the above numbered patent requiring correction and that the said Letters Patent should read as corrected below.

Column 6, line 66, after "claim" insert -- 1 --; line 69, for "steam" read -- stream --.

Signed and sealed this 24th day of January 1967.

(SEAL)
Attest:

ERNEST W. SWIDER                                    EDWARD J. BRENNER
Attesting Officer                                            Commissioner of Patents